United States Patent
Shimizu et al.

(10) Patent No.: US 6,274,687 B1
(45) Date of Patent: Aug. 14, 2001

(54) POWDER OF AGGLOMERATED FINE PARTICLES OF CROSSLINKED ALLYL COPOLYMER

(75) Inventors: Yasumi Shimizu; Seiji Nakamura; Koji Aoki, all of Amagasaki (JP)

(73) Assignee: Daiso Co., Ltd., Osaka-Fu (JP)

( * ) Notice: Subject to any disclaimer, the term of this patent is extended or adjusted under 35 U.S.C. 154(b) by 0 days.

(21) Appl. No.: 09/148,700

(22) Filed: Sep. 4, 1998

(30) Foreign Application Priority Data

Sep. 4, 1997 (JP) .................................................. 9-239553

(51) Int. Cl.$^7$ .................................................. C08F 20/00
(52) U.S. Cl. ........................................ 526/318.1; 524/556
(58) Field of Search .......................... 524/801; 526/318.1

(56) References Cited

U.S. PATENT DOCUMENTS

| | | | | |
|---|---|---|---|---|
| 3,876,572 | * | 4/1975 | Sliwka | 260/17.4 |
| 4,359,564 | * | 11/1982 | Merritt | 526/260 |
| 4,568,616 | * | 2/1986 | Seifried | 428/480 |
| 4,929,692 | * | 5/1990 | Goldenberg | 526/247 |
| 5,275,854 | * | 1/1994 | Maier | 428/36.5 |
| 5,539,071 | * | 7/1996 | Steffler | 526/208 |

FOREIGN PATENT DOCUMENTS

| | | |
|---|---|---|
| 2 224 739 | 5/1990 | (GB) . |
| 2-117948 | 5/1990 | (JP) . |
| 6-78398 | 10/1994 | (JP) . |
| 10-72510 | 3/1998 | (JP) . |

\* cited by examiner

Primary Examiner—Paul R. Michl
(74) Attorney, Agent, or Firm—Foley & Lardner

(57) ABSTRACT

Powder of agglomerated crosslinked allyl copolymer fine particles of (a) more than 40% by weight to 80% by weight of diallyl phthalate, (b) 0.05% by weight to 2% by weight of an $\alpha,\beta$-unsaturated carboxylic acid and (c) a balance of at least one vinyl monomer selected from the group consisting of an aromatic vinyl compound and an acrylate ester or methacrylate ester of an alcohol having 1 to 8 carbon atoms, is very excellent in collapse dispersibility in an organic matrix.

6 Claims, No Drawings

POWDER OF AGGLOMERATED FINE PARTICLES OF CROSSLINKED ALLYL COPOLYMER

FIELD OF THE INVENTION

The present invention relates to powder of agglomerated fine particles of crosslinked allyl copolymer, particularly to powder of agglomerated particles comprising fine particles obtainable by removing an aqueous medium from a crosslinked allyl copolymer fine particles-containing aqueous emulsion. The present powder is useful as a modifying agent for a paint, an adhesive, a varnish or a resin and is very excellent in collapse dispersibility from powder to original fine particles when the powder is dispersed in an organic matrix such as a paint, an adhesive, a varnish or a resin.

RELATED ARTS

Hitherto, in the field of a thermoplastic resin and a thermosetting resin, it is often pointed out that said resins have a defect of so called toughness, namely crack is caused so that a shaped article of said resin is broken, when an external force is applied to the shaped article. In order to eliminate the above defect, there have been used a method comprising adding a rubbery oligomer and dispersing the oligomer as particles having a size of at most several micrometers by a phase separation during the shaping However, in said method, the control of particle diameter and dispersibility of the oligomer not only gives some restrictions, but also the strength such as a flexural strength of the shaped article is unavoidably remarkably decreased.

In order to solve this problem a method of adding powder comprising previously crosslinked rubbery fine particles as the unit particles was developed so that the defect of said oligomer is compensated for the purpose of some types of epoxy resins, as described in, for example, Japanese Patent Kokai Publication No. 117948/1990.

However, said rubbery fine particles have some limitations for the purpose of resins having higher strength. It is pointed out in, for example, Circuit Mounting Society literature, Vol. 11, Page 53 (1996) by Masao TOMOI that the dispersion of harder organic fine particles having an order of submicron in the resins, which is used instead of the rubbery fine particles, has the effectiveness for improving the toughness and preventing the decrease of strength. Although said literature illustrates a method of phase-separating an oligomer having higher glass transition temperature in the resins, the shaping is similarly restricted in view of control of phase separation.

Japanese Patent Application No. 185952/1996 filed by Daiso Co., Ltd. discloses hard organic fine particles which are crosslinked copolymer fine particles comprising diallyl phthalate, $\alpha,\beta$-unsaturated carboxylic acid and an acrylate ester, wherein the content of diallyl phthalate is from 10 to 40% by weight, the content of $\alpha,\beta$-unsaturated carboxylic acid is from 0.1 to less than 5% by weight and a balance is the content of the acrylate ester, and the fine particles are usually prepared by an emulsion polymerization. When the fine particles are mixed with other components such as a resin, it is practically beneficial that the fine particles are separated from the emulsion by the precipitation of particles or the evaporation of aqueous medium so as to give powder. The resultant powder consists of agglomerated fine particles so that it is necessary to disperse to the unit particles when the powder is added to an organic matrix such as a resin. However, it is not necessarily easy to collapse the agglomerate powder into the unit particles, particularly in the case that the powder in a high concentration is added to the resin.

SUMMARY OF THE INVENTION

The present inventors discovered that collapse dispersibility in an organic medium is remarkably improved by decreasing an amount of carboxylic acid which is a hydrophilic group on a surface of a fine particle.

The reason thereof is unclear, but it is supposed to be that an interaction of carboxylic acid between fine particles during the agglomeration or an interaction between carboxylate salt resulting from neutralization of emulsion is decreased, and that a hydrophilic carboxylic acid or carboxylate salt prevents the dispersion in an organic medium having a low dielectric constant.

The present invention provides powder of agglomerated crosslinked allyl copolymer fine particles obtained by emulsion-copolymerizing (a) more than 40% by weight to 80% by weight of diallyl phthalate, (b) 0.05% by weight to 2% by weight of an $\alpha,\beta$-unsaturated carboxylic acid and (c) a balance of at least one vinyl monomer selected from the group consisting of an acrylate ester and methacrylate ester of an alcohol having 1 to 8 carbon atoms in an aqueous medium to give an aqueous emulsion containing crosslinked allyl copolymer fine particles having an average particle diameter of at most 0.5 $\mu$m and separating the aqueous medium from the aqueous emulsion.

DETAILED DESCRIPTION OF THE INVENTION

Diallyl phthalate (a) used in the present invention is a general tern of ortho-, iso- and tere-compounds which are used singly or in combination of at least two.

The $\alpha,\beta$-unsaturated carboxylic acid (b) may be a compound having one carbon—carbon double bond and at least one carboxylic acid group. The $\alpha,\beta$-unsaturated carboxylic acid (b) includes acrylic acid, methacrylic acid (Both of acrylic acid and methacrylic acid are hereinafter referred to as (meth)acrylic acid. Both of an acrylate ester and a methacrylate ester are referred to as a (meth)acrylate ester.), crotonic acid, maleic acid, fumaric acid and itaconic acid. These may be used alone or in combination of at least two.

The vinyl compound (c) is at least one selected from the (meth)acrylate ester. The vinyl compound (c) is preferably the acrylate ester.

The (meth)acrylate ester (c) may be an ester between (meth)acrylic acid and a monohydric alcohol having 1 to 8 carbon atoms. Examples of (meth)acrylate ester (c) include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, cyclopentyl (meth)acrylate, n-hexyl (meth)acrylate, cyclohexyl (meth)acrylate, heptyl (meth)acrylate, methylcyclohexyl (meth)acrylate, octyl (meth)acrylate and 2-ethylhexyl (meth)acrylate. Among them, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate and 2-ethylhexyl (meth)acrylate are particularly preferable.

A portion of the (meth)acrylate ester may be replaced with other vinyl compound, insofar as the hardness of fine particles and the high collapse dispersibility are not deteriorated. Examples of the other vinyl compound includes $\alpha,\beta$-unsaturated carboxylate esters such as a maleate ester, a fumarate ester, an itaconate ester, acetoacetoxy (meth)acrylate and allyl (meth)acrylate; hydroxyl group-containing (meth)acrylate esters of alcohol having at least two hydroxyl groups, such as 2-hydroxyethyl (meth)acrylate, 2-hydroxypropyl (meth)acrylate, 3-hydroxypropyl (meth) acrylate, 2-hydroxybutyl (meth)acrylate, 4-hydroxybutyl (meth)acrylate, (meth)acrylate mono- or di-ester of glycerol, (meth)acrylate mono- or di-ester of trimethylol propane and (meth)acrylate mono-, di- or tri-ester of pentaerythritol; α,β-unsaturated nitriles such as (meth)acrylonitrile; amides of α,β-unsaturated carboxylic acid, such as (meth) acrylamide, (meth)acrylisopropylamide, N-methylol (meth) acrylamide and diacetone (meth)acrylamide; and epoxy-containing vinyl compounds such as glycidyl (meth)acrylate and 2-methylglycidyl (meth)acrylate. The amount of the other vinyl compound is from 0 to 40% by weight based on the vinyl compound (c) including the other vinyl compound.

The vinyl compound (c) may be an aromatic vinyl compound such as styrenes and α-methylstyrenes.

Examples of the styrenes include styrene, and styrenes having an aromatic ring substituted by a halogen atom, an alkyl group, a halogenated alkyl group and/or a vinyl group, such as ortho- or para-chlorostyrene, ortho- or para-methylstyrene, ortho- or para-chloromethylstyrene, divinylbenzene and trivinyl benzene.

Examples of the α-methylstyrenes include α-methylstyrene, and α-methylstyrenes having an aromatic ring substituted by a halogen atom, an alkyl group, a halogenated alkyl group and/or a vinyl group, such as ortho- or para-chloro-α-methylstyrene, ortho- or para-chloromethyl-α-styrene and diisopropenylbenzene.

There may be used other monomers, for example, vinyl esters such as vinyl acetate, vinyl propionate and vinyl long chain-carboxylates (Veova 9 and Veova 10 manufactured by Shell Japan) such as vinyl versatate; α,β-unsaturated aldehydes such as acrolein, methacrolein and crotonaldehyde; α,β-unsaturated ketones such as methyl vinyl ketone; alkoxysilyl group-containing vinyl compounds such as vinyltrimethoxysilane and methacryoxypropyltrimethoxy-silane; vinyl ethers such as ethyl vinyl ether and 2-chloroethyl vinyl ether; (meth)acrylate esters of fluorinated alcohol, such as trifluoroethyl (meth)acrylate; (meth)allyl ethers such as methyl (meth)allyl ether, ethyl (meth)allyl ether, propyl (meth)allyl ether, butyl (meth)allyl ether, hexyl (meth)allyl ether, cyclohexyl (meth)allyl ether, 2-ethylhexyl (meth)allyl ether, phenyl (meth)allyl ether and glycidyl (meth)allyl ether; (meth)allyl esters such as (meth)allyl acetate, (meth) allyl propionate, (meth)allyl butyrate, (meth)allyl benzoate and (meth)allyl lactate; crosslinking monomers having at least two acryl groups or methacryl groups in molecule, such as ethylene glycol di(meth)acrylate, diethylene glycol di(meth)acrylate, propylene glycol di(meth)acrylate, dipropylene glycol di(meth)acrylate, butanediol di(meth)acrylate, hexanediol di(meth)acrylate. glycerol tri(meth)acrylate, trimethylolpropane tri(meth)acrylate, pentaerythritol tetra (meth)acrylate, dipentaerythritol hexa(meth)acrylate and triazine tri(meth)acrylate and phosphazene tri(meth)acrylate; and monomers having at least two acrylamide groups or methacrylamide groups in molecule, such as ethylenediamine di(meth)acrylamide, hexanediamine (meth) acrylamide and phenylene diamine di(meth)acrylamide.

Examples of the other monomers additionally include crosslinking monomers having at least two aromatic conjugated vinyl groups in molecule, such as divinylbenzene, trivinylbenzene and diisopropenylbenzene; crosslinking unsaturated aliphatic or unsaturated cycloaliphatic compounds having at least two unsaturated bonds in molecule, such as butadiene, isoprene, 1,5-hexadiene and vinylcyclohexene; crosslinking monomers having at least two allyl ether groups or methallyl ether groups in molecule, such as ethyleneglycol di(meth)allyl ether, propyleneglycol di(meth)allyl ether, hexanediol di(meth)allyl ether, trimethylolpropane tri(meth)allyl ether, pentaerythritol tetra(meth) allyl ether, dimethylolcyclohexane di(meth)allyl ether and tri(meth)allyl icocyanurate; crosslinking monomers having at least two ally ester groups or methallyl ester groups in molecule, such as di(meth)allyl carbonate, di(meth)allyl oxalate, di(meth)allyl succinate, di(meth)allyl fumarate, di(meth)allyl maleate, di(meth)allyl adipate and di(meth) allyl cyclohexane dicarboxylate; amine compounds having at least two allyl groups or methallyl groups in molecule, such as di(meth)allylamine, tri(meth)allylamine, methyldi (meth)allylamine and dimethyldi(meth)allylammonium chloride; and monomers having different polymerizable groups in molecule, such as (meth)allyl vinyl ether and (meth)allyl (meth)acrylate. The amount of the other monomers is at most 40% by weight, preferably at most 30% by weight, more preferably at most 25% by weight based on the vinyl compound (c).

In the monomer composition comprising monomers (a), (b) and (c), if diallyl phthalate (a) is at most 40% by weight, the high properties of hard fine particles are deteriorated and the undesirable properties occur in an application field requiring high powder fluidity. If the amount of diallyl phthalate (a) is larger than 80% by weight, the improvement of hardening effect by the crosslinking of diallyl phthalate cannot be obtained and undesirably the reaction of residual monomers in the emulsion polymerization reaction remarkably delays. The amount of diallyl phthalate is preferably from 45 to 75% by weight, for example from 50 to 70% by weight, particularly from 55 to 65% by weight, based on the copolymer.

The amount of the α,β-unsaturated carboxylic acid (b) is usually from 0.05 to 2% by weight, preferably from 0.05 to 1.8% by weight, more preferably from 0.05 to 1.5% by weight, based on the copolymer. If the amount of the α,β-unsaturated carboxylic acid is larger than 2% by weight, collapse dispersibility from the agglomerate powder to unit particles (namely, primary particles or fine particles) is remarkably decreased so that it is not easy to effectively exhibit the effect of submicron particles in the case that the copolymer is added to organic matrix such as an organic solvent, an organic monomer and a resin. If the amount of the α,β-unsaturated carboxylic acid is smaller than 0.05% by weight, the reactivity between the copolymer and a resin is poor when the copolymer is added to the resin, so that the copolymer cannot be fixed to the resin by a chemical bond and fine particles often agglomerated under a designed condition, for example, during the curing. In the formation reaction of chemical bond to the resin, even if the reactivity between a reaction cite of the resin and carboxylic acid is poor, the fine particles can be bonded to the resin, for example, by a successive method comprising using, as a medium, a compound having a functional group reacting with a reaction cite of the resin and another functional group reacting with carboxylic acid possessed by the fine particles of the present invention, and previously bonding the medium to the fine particles or the resin, or by a direct method wherein the fine particles, the resin and the medium are present during the curing.

Preferably, in the present invention, the resultant crosslinked allyl copolymer fine particles have an acid value of from 0.4 to 15 mg-KOH/g-copolymer, more preferably from 0.4 to 13 mg-KOH/g-copolymer, most preferably from 0.4 to 11 mg-KOH/g-copolymer by considering the type and amount of the α,β-unsaturated carboxylic acid (b).

The crosslinked allyl copolymer fine particles of the present invention are preferably prepared in a reaction medium (namely, an aqueous medium) consisting of water and optionally a small amount (for example, 0 to 30% by weight based on the weight of the aqueous medium) of an organic solvent. The fine particles may be also prepared in a reaction medium mainly containing a poor solvent to the fine particles of the present invention, such as an alcohol by other methods such as a suspension polymerization, a dispersion polymerization and a precipitation polymerization.

The agglomerate powder of fine particles can be obtained by removing a reaction medium from a reaction mixture containing the crosslinked allyl copolymer fine particles and the reaction medium prepared by the above method.

The crosslinked allyl copolymer fine particle-containing aqueous emulsion of the present invention can be produced by adding an emulsifier and a polymerization initiator to the above monomers (a), (b) and (c) in an aqueous medium (the concentration of the monomers (a), (b) and (c) in the aqueous medium is usually from 2 to 60% by weight) and then emulsion-polymerizing the mixture at a polymerization temperature of 40 to 100° C., preferably 50 to 90° C. For this reaction, the monomers may be firstly added in one portion or may be added gradually as the reaction proceeds. For this addition, the monomers may be added in the form of an emulsion prepared by emulsifying them with the emulsifier. The reaction is normally conducted under stirring, but a disper, a homogenizer, etc. may also be used in addition to a normal stirring method. The reaction can also be conducted with stirring or non-sting under the condition of ultrasonic wave irradiation.

The polymerization degree of diallyl phthalate is not critical and is preferably at least 70%, more preferably at least 80%, particularly at least 85% in order to effectively obtain the copolymer having the desired composition. The gel fraction of the copolymer may be at least 70%, particularly at least 80%, especially at least 90%.

The average particle diameter of the crosslinked allyl copolymer fine particles contained in the emulsion of the present invention is preferably at most 0.5 $\mu$m in view of use thereof. If the average particle diameter is larger than 0.5 $\mu$m, the improvement efficiency per addition amount is decreased. The average particle diameter may be particularly at most 0.3 $\mu$m, for example at most 0.2 $\mu$m, and, for example, at least 0.01 $\mu$m.

The emulsion containing fine particles can be obtained by the emulsion polymerization using an emulsifier in an amount of 0.1 to 10% by weight, preferably 0.5 to 7% by weight, based on the total monomers. The emulsifier may be added in one portion at first or may be added in several portions as the reaction proceeds.

The emulsifier used in the present invention to prepare the crosslinked allyl copolymer fine particles-containing aqueous emulsion includes cationic, anionic, nonionic, amphoteric, anion-nonion mixed and composite surfactants. Usually, the anionic, anion-nonion mixed or composite surfactant gives good results.

Examples of cationic surfactants include primary amine hydrochloride, secondary amine hydrochloride, tertiary amine hydrochloride and quaternary ammonium salt.

Examples of anionic surfactants include fatty acid salts, sulfate ester salts of higher alcohol, sulfate esters of fatty oil, sulfate salts of aliphatic amines and aliphatic amides, phosphate esters of aliphatic alcohol, sulfonate salts of dibasic fatty acid esters, sulfonate salts of aliphatic amides, alkyl aryl sulfonate salts and formalin-condensated naphthalene-sulfonate salts.

Examples of nonionic surfactants include polyoxyethylene alkyl ether, polyoxyethylene polyoxypropylene alkyl ether, polyoxyethylene aryl ether, polyoxyethylene polyoxypropylene aryl ether, polyoxyethylene alkyl aryl ether, polyoxyethylene polyoxypropylene alkyl aryl ether, polyoxyethylene alkyl ester, polyoxyethylene polyoxypropylene alkyl ester, sorbitan alkyl ester and polyoxyethylene sorbitan alkyl ester.

Examples of amphoteric surfactants include those of amino acid type, betaine type, sulfate ester type, sulfonate salt type and phosphate ester salt type.

The above enumerated anionic and nonionic surfactants may be suitably selected and mixed for use as the anion-nonion mixed surfactant. Examples of such anion-nonion composite surfactants include ammonium salts, sodium salts and potassium salts of sulfate or phosphate esters of nonionic surfactants such as polyoxyethylene alkyl aryl ethers, polyoxyethylene alkyl ethers, polyoxyethylene polyoxypropylene alkyl ethers, polyoxyethylene aryl ethers, polyoxyethylene polyoxypropylene aryl ethers and polyoxyethylene polyoxypropylene alkyl aryl ethers.

A reactive emulsifier having a polymerizable double bond in one molecule may also used as the emulsifier in the present invention. Specific examples include Eleminol JS-2 and RS-30 (trade names of Sanyo Chemical Industries, Ltd.); Acuaron RN-20, RN-30, RN-50, HS-10, HS-20, HS-1025 and New Frontiers (trade names of Dai-ichi Kogyo Seiyaku Co., Ltd.); and Antox MS-60, RMA-1120 and RMA-500 series (trade names of Nippon Nyukazai Co., Ltd.).

The reactive emulsifiers may be used singly or in combination of at least two or used in combination with an emulsifier other than the reactive emulsifier.

As the polymerization initiator used in the present invention, a water-soluble radical generator is preferable and examples include ammonium persulfate, potassium persulfate, sodium persulfate, hydrogen peroxide, and water-soluble azo or redox polymerization initiators.

Examples of such water-soluble azo polymerization initiators include hydrochlorides of azo compounds having an amino group and/or an amino group, such as 2,2-azobis(2-methyl-N-phenylpropionamidine)dihydrochloride, 2,2-azobis(N-(4-chlorophenyl), 2-methylpropionamidine) dihydrochloride, 2,2-azobis(2-methyl-N-(phenylmethyl) propionamidine)dihydrochloride and 2,2-azobis(2-methyl-N-(2-propenyl)propionamidine)dihydrochloride; and hydrochlorides of azo compounds having a cyclic amino group or amino group, such as 2,2-azobis(2-(5-methyl-2-imidazolin-2-yl)propane)dihydrochloride, 2,2-azobis(2-(2-imidazolin-2-yl)propane)dihydrochloride, 2,2-azobis(2-(4,5,6,7-tetrahydro-1H-1,3-diazepin-2-yl)propane) dihydrochloride and 2,2-azobis(2-(5-hydroxy-3,4,5,6-tetrahydropyrimidin-2-yl)propane)dihydrochloride.

Examples of the redox polymerization initiator include a combination of potassium persulfate or ammonium persulfate with sodium hydrogensulfite, sodium metabisulfite, acidic sodium sulfite or Rongalite (sodium formaldehyde sulfoxylate dihydrate), a combination of an organic peroxide such as t-butyl hydroperoxide and cumene hydroperoxide with an acidic sodium sulfite or Rongalite. If necessary, a lipophilic peroxide such as benzoyl peroxide and tertiary butyl hydroperoxide, or a lipophilic azo compound such as 2,2'-azobisisobutyronitrile and 1,1'-azobis(cyclohexane-1-carbonitrile) can also be used as the initiator.

The amount of the polymerization initiator used is in the range of 0.05 to 5% by weight based on the monomers, and may be added in one portion or added little by little.

For the production of the emulsion of the present invention, a part or all of carboxyl groups in the copolymer fine particles obtained by the copolymerization and acid groups formed as by-products by the decomposition of the polymerization initiator are preferably neutralized or alkalized with a neutralizer.

Examples of such neutralizer include inorganic alkalis such as potassium hydroxide and sodium hydroxide; and amines such as ammonia, monomethylamine, dimethylamine, trimethylamine, monoethylamine, diethylamine, triethylamine, mono-n-propylamine, dimethyl-n-propylamine, monoethanolamine, diethanolamine, triethanolamine, N-methylethanolamine, N-aminoethylethanolamine, N-methyldiethanolamine, monoisopropanolamine, diisopropanolamine, triisopropanolamine, N,N-dimethylpropanolamine and 2-amino-2-methylpropanol, from which one or more neutralizers can be selected for use.

The agglomerate powder can be obtained by removing an aqueous medium from the aqueous emulsion containing the crosslinked allyl copolymer fine particles having an average particle diameter of at most 0.5 μm obtained by the above emulsion polymerization. The agglomerate powder can be comminuted to powder having a desired particle diameter. A shape and particle diameter of agglomerate powder are not critical. The average particle diameter of the agglomerate powder is preferably from 2 to 500 μm, particularly from 5 to 400 μm in view of handling and workability. The powder may be shaped into pellets for utilization.

A method for removing the aqueous medium from the aqueous emulsion includes a method separating the particles by precipitating the agglomerates from the emulsion by a salting-out and drying the agglomerates, a freeze-dry method, a hot-roll drying method and a spray dryer method which are used in the present technical field.

The resultant agglomerate powder can be collapsed and dispersed to crosslinked allyl copolymer fine particles which are primary particles by adding the agglomerate powder to an organic matrix such as an organic solvent, various monomers, a thermoplastic resin and a thermosetting resin. The collapse dispersion can be conducted by a method directly adding a mechanical shear by a homomixer, a disper, a homogenizer, a sand mil, a bead mil, and a roll incorporation, and a method adding a vibrational impact such as a ultrasonic wave and a high frequency wave.

The organic matrix may previously contain a filler, a pigment, a plasticizer, a curing agent, a thermo- or photo-curing accelerator, a shrinkage preventing agent, an antioxidant and/or a photo-stabilizing agent which are used as an additive for a resin.

When the agglomerate powder is collapse dispersed in the organic matrix, the powder is previously dispersed in the organic solvent, the monomer or the like and the resin added to the dispersion to give a resin composition.

Whether or not the collapse dispersibility of the agglomerate powder in the organic matrix is good, gives evaluation whether or not the properties of the crosslinked allyl copolymer fine particles which are primary particles are sufficiently exhibited. It is important that, even if the agglomerate powder in a high concentration is added to the matrix, the powder is sufficiently collapse dispersed so that the agglomerate powder is substantially absent in the matrix.

The agglomerate powder can act as a stress relaxing agent, a low shrinkage agent, a crosslinking agent, an organic filler, a thickening agent, a thixotropic agent, a gloss agent, a matting agent or the like.

The organic matrix which can collapse disperse the agglomerate powder of the present invention includes an organic solvent a monomer and a resin.

Examples of the organic solvent include alcohols such as methanol, ethanol, isopropanol, butanol, 2-ethylhexanol, ethylene glycol and propylene glycol; ketones such as acetone, methyl ethyl ketone and cylcohexanone; ethers such as diethyl ether, dibutyl ether, tetrahydrofuran and dioxane; low-reactivity aromatic compounds such as benzene, toluene, xylene and chlorobenzene; reactive aromatic compounds such as phenol and cresol; nitriles such as acetonitrile and propionitrile; and water-soluble highly polar solvents such as dimethylsulfoxide and dimethylformamide. Among them, the ketones, the low-reactivity aromatic compounds, the reactive aromatic compounds, the nitriles and the water-soluble highly polar solvents are preferable.

Examples of the monomer include (meth)acrylate esters such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth) acrylate, pentyl (meth)acrylate, cyclopentyl (meth)acrylate, hexyl (meth)acrylate, cyclohexyl (meth)acrylate, heptyl (meth)acrylate, methylcyclohexyl (meth)acrylate, octyl (meth)acrylate and 2-ethylhexyl (meth)acrylate; hydroxyl group-containing (meth)acrylate ester such as 2-hydroxyethyl (meth)acrylate, 2-hydroxypropyl (meth) acrylate, 3-hydroxypropyl (meth)acrylate, 2-hydroxybutyl (meth)acrylate, 4-hydroxybutyl (meth)acrylate and 2,3-dihydroxypropyl (meth)acrylate; (meth)acrylates having aromatic group such as phenyl (meth)acrylate and benzyl (meth)acrylate; (meth)acrylates having an epoxy group, such as glycidyl (meth)acrylate; (meth)acrylate esters of fluorinated alcohol such as trifluoroethyl (meth)acrylate, perfluoroalkyl (meth)acrylate and (meth)acrylate of perfluoroalcohol substituted with hydrogen at 1-position.

Examples of the monomer additionally include α,β-unsaturated carboxylate esters such as a maleate ester, a fumarate ester, an itaconic ester and acetoacetoxy (meth) acrylate; aromatic conjugated vinyl compounds such as α-methylstyrene; α,β-unsaturated nitriles such as acrylonitrile and methacrylonitrile vinyl esters such as vinyl acetate, vinyl propionate and vinyl long-chain carboxylate (Veova 9 and Veova 10 manufactured by Shell Japan); α,β-unsaturated aldehydes such as acrolein, methacrolein and crotonaldehyde; α,β-unsaturated ketones such as methyl vinyl ketone; alkoxysilyl group-containing vinyl compounds such as vinyl trimethoxysilane and methacryoxypropyltrimethoxysilane; vinyl ethers such as methyl vinyl ether, ethyl vinyl ether and 2-chloroethyl vinyl ether; (meth)acrylate esters having fluorinated alcohol, such as trifluoroethyl (meth)acrylate; (meth)allyl ethers such as methyl (meth) allyl ether, ethyl (meth)allyl ether, propyl (meth)allyl ether, butyl (meth)allyl ether, hexyl (meth)allyl ether, cyclohexyl (meth)allyl ether, 2 -ethylhexyl (meth)allyl ether, phenyl (meth)allyl ether and cresyl (meth)allyl ether; (meth)allyl esters such as (meth)allyl acetate, (meth)allyl propionate, (meth)allyl butyrate, (meth)allyl benzoate and (meth)allyl lactate; and di(meth)allyl ethers of aromatic dibasic acid such as ortho- meta- or para-di(meth)allyl phthalate and 2,6-naphthalenedicarbonate diallyl ether.

The monomer further includes crosslinking monomers having at least two acryl groups or methacryl groups in molecule, such as ethylene glycol di(meth)acrylate, diethylene glycol di(meth)acrylate, propylene glycol di(meth) acrylate, dipropylene glycol di(meth)acrylate, butanediol di(meth)acrylate, hexanediol di(meth)acrylate, glycerol tri (meth)acrylate, trimethylolpropane tri(meth)acrylate, pentaerythritol tetra(meth)acrylate, dipentaerythritol hexa (meth)acrylate, triazine tri(meth)acrylate and phosphazene tri(meth)acrylate; monomers having at least two acrylamide groups or methacrylamide groups in molecule, such as ethylenediamine di(meth)acrylamide, hexanediamine (meth)acrylamide and phenylene diamine di(meth) acrylamide; crosslinking monomers having at least two aromatic conjugated vinyl groups in molecule, such as divinylbenzene, trivinylbenzene and diisopropenylbenzene; crosslinking unsaturated aliphatic or unsaturated cycloaliphatic compounds having at least two unsaturated bonds in molecule, such as butadiene, isoprene, 1,5-hexadiene and vinylcyclohexene; crosslinking monomers having at least two allyl ether groups or methallyl ether groups in molecule, such as ethyleneglycol di(meth)allyl ether, propyleneglycol di(meth)allyl ether, hexanediol di(meth)allyl ether, trimethylolpropane di(meth)allyl ether, pentaerythritol tetra(meth)allyl ether, dimethylolcyclohexane di(meth)allyl ether and tri(meth)allyl icocyanurate; crosslinking monomers having at least two ally ester groups or methallyl ester groups in molecule, such as di(meth)allyl carbonate, di(meth)allyl oxalate, di(meth)allyl succinate, di(meth)allyl fumarate, di(meth)allyl maleate, di(meth)allyl adipate and di(meth)allyl cyclohexanedicarboxylate; amine compounds having at least two allyl groups or methallyl groups in molecule, such as di(meth)allylamine, tri(meth)allylamine, methyldi(meth)allylamine and dimethyldi(meth)allyl-ammonium chloride; and monomers having different polymerizable groups in molecule, such as (meth)allyl vinyl ether and (meth)allyl (meth)acrylate.

Examples of the monomer yet further include glycidyl ethers such as methyl (meth)glycidyl ether, ethyl (meth) glycidyl ether, propyl (meth)glycidyl ether, butyl (meth) glycidyl ether, 2-ethylhexyl (meth)glycidyl ether and phenyl glycidyl ether; glycidyl esters such as glycidyl acetate, glycidyl propionate, glycidyl benzoate and glycidyl versatate; and epoxy group-containing compounds, referred to as a reactive diluting agent, such as styrene oxide and vinyl hexene oxide.

Examples of the resin include an epoxy resin and an unsaturated polyester resin. The resin can be used in the presence of a low molecular weight compound selected from the above organic solvent and monomer.

The amount of the agglomerate powder may be from 0.01 to 500 parts by weight, for example, from 0.1 to 50 parts by weight, based on 100 parts by weight of the organic matrix.

PREFERRED EMBODIMENTS OF THE INVENTION

Hereinafter, the present invention is described by way of Examples. In the Examples, "%" is on a weight basis.

EXAMPLES 1 TO 7 AND COMPARATIVE EXAMPLES 1 TO 3

Sodium dodecylbenzenesulfonate and water were introduced into a 1 L separable flask equipped with a stirrer, a thermometer, a condenser, a gas introducing inlet and a raw material introducing inlet to prepare an aqueous emulsifier solution.

| | | |
|---|---|---|
| (1) | Sodium dodecylbenzenesulfonate | amount (g) shown in Table 1 |
| | Water | 250 g |
| | Separately, an emulsified monomer (2) having the following composition was prepared | |
| (1) | Sodium dodecylbenzenesulfonate | amount (g) shown in Table 1 |
| | Water | 180 g |
| | (a) Diallyl phthalate | amount (g) shown in Table 1 |
| | (b) α, β-unsaturated carboxylic acid | amount (g) shown in Table 1 |
| | (c) (meth)acrylate ester | amount (g) shown in Table 1 |

The internal temperature of the separable flask was raised at 70° C. (75° C. in Examples 6 and 7 and Comparative Example 2), and the atmosphere in the flask was sufficiently replaced by nitrogen under stirring at 300 rpm by a semicircular stirring blade. Then, 10% of the emulsified monomer (2) was introduced into the flask and an aqueous solution of ammonium persulfate (APS) (amount (g) shown in Table 1) in water (10 g) was added to the flask. The mixture was reacted for 1 hour, and there the remainder (90%) of the emulsified monomer (2) was gradually added over 4.5 hours. The polymerization was carried out at 70° C. for 9 hours since the addition of APS. The reaction mixture was cooled and neutralized with an aqueous ammonia solution. The properties are shown in Table 1.

TABLE 1

| | | Example No. | | | | | | | Com. Example No. | | |
|---|---|---|---|---|---|---|---|---|---|---|---|
| | | 1 | 2 | 3 | 4 | 5 | 6 | 7 | 1 | 2 | 3 |
| a | DAP | 148/41 | 148/41 | | 148/41 | 148/41 | 172/60 | 172/60 | 148/41 | 172/60 | |
| | DAT | | | 77/41 | | | | | | | 77/41 |
| b | AA | 3.6/1.0 | | 0.9/0.5 | 3.6/1.0 | 5.4/1.5 | 2.9/1.0 | 1.4/0.5 | 9.0/2.5 | 7.1/2.5 | 5.7/3.0 |
| | MA | | 9.0/2.0 | | | | | | | | |
| c | EA | 209/58 | 205/57 | 111/58.5 | 137/38 | 171/47.5 | 112/39 | 113/39.5 | 203/56.5 | 107/37.5 | 106/56 |
| | BA | | | | | 36/10 | | | | | |
| | 2-EHA | | | | 36/10 | | | | | | |
| | MMA | | | | 36/10 | | | | | | |
| DBS(1)/(2) | | 2.2/5.0 | 2.2/5.0 | 1.7/4.0 | 2.2/5.0 | 2.2/5.0 | 2.0/4.4 | 2.0/4.4 | 2.2/5.0 | 2.0/4.4 | 1.7/4.0 |
| APS | | 1.26 | 1.26 | 0.66 | 1.26 | 1.26 | 1.00 | 1.00 | 1.26 | 1.00 | 0.66 |
| Emulsion | | | | | | | | | | | |
| Solid content (%) | | 45 | 45 | 30 | 45 | 40 | 40 | 40 | 45 | 40 | 30 |
| Polymerization degree (%) of DAP, DAT | | 93 | 92 | 92 | 94 | 93 | 91 | 90 | 92 | 92 | 93 |
| Average particle diameter (μm) | | 0.103 | 0.110 | 0.105 | 0.121 | 0.115 | 0.078 | 0.080 | 0.108 | 0.083 | 0.101 |
| Acid value | | 7.6 | 10.1 | 3.6 | 7.7 | 11.3 | 7.4 | 3.6 | 18.9 | 18.5 | 22.3 |

In Table 1, the numeral values for each component represent the addition amount (g)/(% by weight based on the total of (a) plus (b) plus (c)). Numeral values for DBS represent the amount (in gram) of the emulsifier solution (1) and emulsified monomer (2) shown in (1)/(2), In Table 1, the abbreviations have the following meanings:

DAP: Diallyl orthophthalate
DAT: Diallyl terephthalate
EA: Ethyl acrylate
BA: Butyl acrylate
2-EHA: 2-Ethylhexyl acrylate
MMA: Methyl methacrylate
AA: Acrylic acid
MA; Methacrylic acid
DBS: Sodium dodecylbenzenesulfonate
APS: Ammonium persulfate Properties shown in Table 1 were determined as follows:

Polymerization degree of diallyl phthalate(%)=((weight of charged monomer)−(weight of unreacted monomer))×100/(weight of charged monomer)

The amount of the unreacted monomer was measured by a gas chromatography.

The average particle diameter was measured by using a laser particle diameter analyzing system PHOTON CORRELATOR LPA-3000 (manufactured by Ohtsuka Denshi Co., Ltd.).

An acid value was measured by the following method:

10.0 g of emulsion is precisely weighed in a 200 mL Erlenmeyer flask and a mixture liquid (50 mL) of ethanol and toluene in a volume ratio of 1:1 is added so that the emulsion has appearance of solution. If the appearance of solution is insufficient, 20 mL of the mixture liquid is additionally added. Then, using a phenolphthalein as an indicator, the emulsion was titrated with a 0.1 N KOH-95% ethanol solution. The acid value was calculated by the following equation:

$$\text{Acid value(mg·KOH/g-copolymer)} = (0.1 \times F \times 56.1 \times V)/(Ws \times E/100)$$

wherein F is a factor of 0.1 N KOH, V is a titrated amount (mL), E is an emulsion concentration (%) and Ws is an amount (g) of emulsion.

The emulsion prepared in each of Examples 1 to 7 and Comparative Examples 1 to 3 was dried by a freeze-dry process to give agglomerate powder. The freeze-dry process was conducted by freezing the emulsion by dry ice and vacuum-drying the emulsion in a freeze-dry vessel.

The resultant agglomerate powder had an average particle diameter of 5 to 100 μm and various shapes.

EXAMPLES 8 TO 18 AND COMPARATIVE EXAMPLES 4 TO 8

The agglomerate powder obtained in Examples 1 to 7 and Comparative Examples 1 to 3 was mixed with each of styrene (A), bisphenol F epoxy resin (B) (Epichlon 830 LVP manufactured by Dainippon Ink & Chemicals, Inc.) and bisphenol A epoxy resin (C) (Epikote 828 manufactured by Yuka Shell Epoxy Co., Ltd.) to determine the collapse dispersibility. The results are shown in Table 2.

The collapse dispersibility was determined as follows:

The agglomerate powder (0.7 g) prepared in each Example and the above matrix (7 g) were charged in a 20 mL screw tube. The tube was sealed and irradiated at 40–50° C. by an ultrasonic irradiator (SILENTSONIC UT-204 manufactured by Sharp Corp.) at a maximum intensity for a given time. The mixture liquid was sandwiched between two cover glasses and observed by an optical microscope (OPTIPHOT-2 manufactured by Nikon Corp.) at die magnification of 100 times, or if necessary of 400 times to evaluate the presence or absence of uncollapsed particles. According to is method, large particles having original particle diameter of 5 to 100 μm in the case of almost uncollapsed particles, while the large particles decrease and cannot be observed dependending on the progress of collapse dispersion. The observation limit of small particle is about 1 μm and the particle larger than this limit can be observed.

Evaluation criteria of the collapse dispersibility is as follows:

OO: Particles are not observed at all
O: A small amount of small particles having diameter of 1–10 μm during the course of collapse are observed
X: A large amount of small particles having diameter larger than 1–10 μm during the course of collapse are observed
XX: Particles having almost original diameter are observed

TABLE 2

|  | Example No |  |  |  |  |  |  |  |  |  |  | Com. Example No. |  |  |  |  |
|---|---|---|---|---|---|---|---|---|---|---|---|---|---|---|---|---|
|  | 8 | 9 | 10 | 11 | 12 | 13 | 14 | 15 | 16 | 17 | 18 | 4 | 5 | 6 | 7 | 8 |
| Matrix | A | A | B | B | B | B | B | B | B | B | C | A | B | B | C | B |
| Used agglomerate powder Example No. | 6 | 7 | 1 | 2 | 3 | 4 | 5 | 6 | 6 | 7 | 6 | 2 | 1 | 2 | 2 | 3 |
| Ultrasonic irradiation (hr) | 1 | 1 | 2 | 2 | 3 | 2 | 2 | 3 | 6 | 3 | 7 | 1 | 2 | 6 | 7 | 3 |
| Collapse dispersibility | oo | oo | oo | oo | o | o | oo | o | oo | oo | oo | XX | XX | XX | X | X |

EFFECT OF THE INVENTION

The agglomerate powder obtained by removing the aqueous medium from the emulsion containing the fine particles is very excellent in collapse dispersibility in the organic matrix. The agglomerate powder can sufficiently exhibit the properties possessed by the fine particle itself and can be used as a modifying agent for a paint, an adhesive, a varnish and a resin.

What is claimed is:

1. Powder of agglomerated crosslinked allyl copolymer fine particles obtainable by emulsion-copolymerizing (a) more than 40% by weight to 80% by weight of diallyl phthalate, (b) 0.05% by weight to 2% by weight of an α,β-unsaturated carboxylic acid and (c) a balance of at least one vinyl monomer selected from the group consisting of an acrylate ester and methacrylate ester of an alcohol having 1 to 8 carbon atoms in an aqueous medium to give an aqueous emulsion containing crosslinked allyl copolymer fine particles having an average particle diameter of at most 0.5 μm and separating the aqueous medium from the aqueous emulsion.

2. Powder according to claim 1, wherein diallyl phthalate (a) is at least one monomer selected from diallyl orthophthalate, diallyl isophthalate and diallyl terephthalate.

3. Powder according to claim 1, wherein the α,β-unsaturated carboxylic acid (b) is at least one monomer selected from acrylic acid, methacrylic acid, crotonic acid, maleic acid, fumaric acid and itaconic acid.

4. Powder according to claim 1, wherein the vinyl monomer (c) is at least one monomer selected from methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, t-butyl acrylate, t-butyl methacrylate, pentyl acrylate, pentyl methacrylate, cyclopentyl acrylate, cyclopentyl methacrylate, n-hexyl acrylate, n-hexyl methacrylate, cyclohexyl acrylate, cyclohexyl methacrylate, heptyl acrylate, heptyl methacrylate, methylcyclohexyl acrylate, methylcyclohexyl methacrylate, n-octyl acrylate, n-octyl methacrylate, 2-ethylhexyl acrylate and 2-ethylhexyl methacrylate.

5. An emulsion comprising:

(i) an allyl copolymer of (a) more than 40% by weight to 80% by weight of diallyl phthalate, (b) 0.05% by weight to 2% by weight of an α,β-unsaturated carboxylic acid and (c) a balance of at least one vinyl monomer selected from the group consisting of an acrylate ester and methacrylate ester of alcohol having 1 to 8 carbon atoms, and (ii) an aqueous medium, wherein crosslinked allyl copolymer fine particles contained in the emulsion have an average particle diameter of at most 0.5 μm.

6. Crosslinked allyl copolymer fine particles comprising an allyl copolymer of (a) more than 40% by weight to 80% by weight of diallyl phthalate, (b) 0.05% by weight to 2% by weight of an α,β-unsaturated carboxylic acid and (c) a balance of at least one vinyl monomer selected from the group consisting of an acrylate ester and methacrylate ester of an alcohol having 1 to 8 carbon atoms, wherein the crosslinked allyl copolymer fine particles have an average particle diameter of at most 0.5 μm.

* * * * *